March 10, 1936. F. A. AUER 2,033,670
CLEANING APPLIANCE
Filed July 22, 1933 2 Sheets-Sheet 1

INVENTOR.
FRANCIS A. AUER
BY
ATTORNEY.

March 10, 1936.  F. A. AUER  2,033,670
CLEANING APPLIANCE
Filed July 22, 1933  2 Sheets-Sheet 2
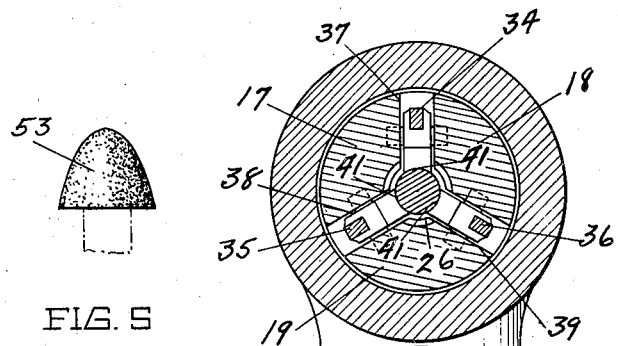
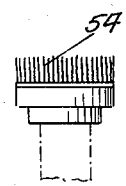
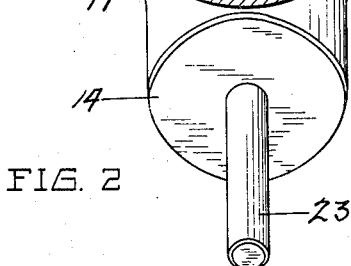
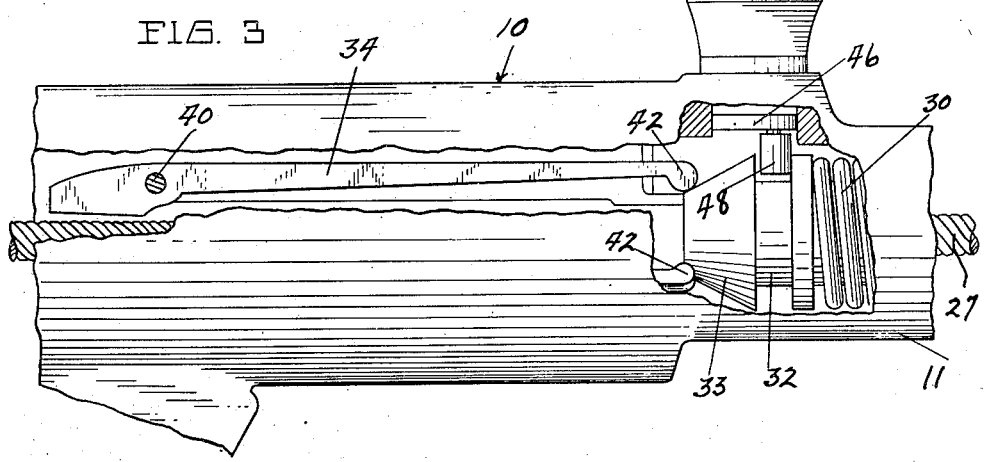
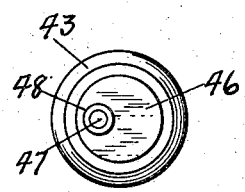
INVENTOR.
FRANCIS A. AUER
BY
ATTORNEY.

Patented Mar. 10, 1936

2,033,670

UNITED STATES PATENT OFFICE 2,033,670

CLEANING APPLIANCE

Francis A. Auer, Napa, Calif.

Application July 22, 1933, Serial No. 681,798

2 Claims. (Cl. 15—104.30)

The present invention generally to new and useful improvements in flexible cleaning, and reaming apparatus and more particularly to improvements in conduit ferrets.

In wiring building structures electricians ofttimes experience considerable difficulty in forcing the wires through the conduits due to the fact that they have become clogged with plaster, refuse and even cement. It is therefore, at times impossible for electricians to force the wires through these pipes or conduits and considerable delay and expense is occasioned thereby.

I have therefore, provided a flexible cleaning, and reaming apparatus that may be utilized to clean, ream and clean out the obstructions in conduits and pipes which may be successfully employed to obviate these disadvantages.

The flexible driving element of the cleaner or reamer consists of a cable having the cleaning tool fastened to its free end and adapted to assume all manner of curvatures as in cleaning out L's and the like in conduits and piping, a means for feeding, driving, and gripping the cable being included in the apparatus.

An object of the invention is to provide a device in which the cleaning cable extends centrally through the casing and in which the cable gripping member encircles the cable and is power driven so as to constantly rotate when the device is in use. A handle on the casing is operatively connected to the cable gripping member so that the operator can manually turn the handle and free the member from the cable while the member is still rotating. When the handle is released, a spring will instantly cause the rotating member to grip and to rotate the cable.

The advantage of this over a manually rotated cable is that the operator can keep his hands in the same position on the casing when feeding the cable into the pipe as when he is moving the casing into a new position on the cable, whereas in a manually operated device, the cable rotating means must be stopped and the hands used for freeing the chuck from the cable and for moving the device into a new position on the cable.

A still further object of the invention is the provision of an apparatus of the class indicated that embodies novel and positive means for the control of the cable gripping means.

Other objects and advantages of the invention will become apparent with reference to the subjoined specification and the accompanying two sheets of drawings in which:—

Figure 2 is a transverse section taken on the line 2—2 of Figure 1 and illustrating the relative positions of the gripping fingers and the cable;

Figure 3 is a fragmentary elevation of the device with portions broken away to disclose the gripping mechanism in retracted position or when the cable is released;

Figure 4 is a bottom plan view of the gripping mechanism actuating handle and crank;

Figure 5 is a detail view of a grinding or reaming element which may be used in connection with the apparatus; and Figure 6 is a detail view of a wire brush that may be applied to the cable for cleaning purposes.

Figure 1:
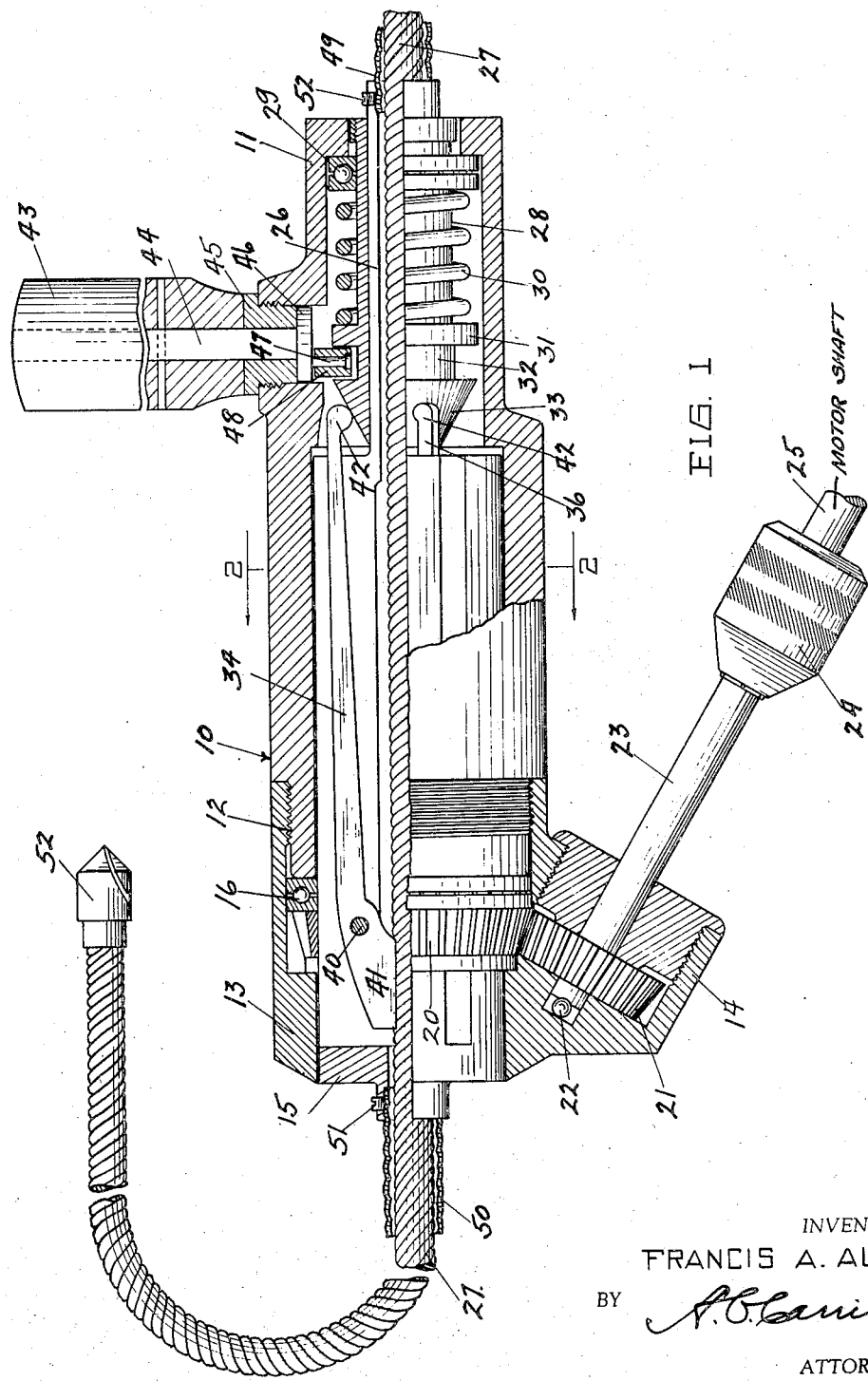
Figure 1 is a longitudinal sectional view illustrating the entire apparatus and showing the driving cable in place in gripped or operative position, a cleaner being indicated on the working end of the cable.

Referring more particularly to the drawings and especially to Figure 1 thereof which discloses the preferred form of the invention the numeral 10 designates a cylindrical metallic casing having a reduced section 11 formed at one end thereof and an externally threaded open ended section 12 formed at the opposite end.

A cap member 13 is screwed onto the threaded end 12 and has integrally formed therewith an angularly disposed gear housing 14.

A closure element 15 is inserted in the open end of the cap 13 and is free to rotate relative to said cap by virtue of the ball bearing race way 16 surrounding the inwardly projecting segmental elements 17, 18 and 19, Figure 2, said elements being integrally formed with said closure 15.

A driven gear 20 surrounds the elements 17, 18 and 19 and is secured thereto and is free to rotate against the ball race 16. A driving pinion 21 having a ball thrust 22 is arranged in the housing 14 and meshes with the gear 20, said pinion being driven by means of a driving shaft 23 having a chuck 24 which chuck is carried by a motor shaft 25, the motor not being shown.

The segments 17, 18 and 19 terminate in an elongated split tubular element 26, Figures 1 and 2 which surround and provide a guiding bore for the cable 27.

The gripping arm actuating mechanism 28 consists of a sleeve surrounding the tubular elements 26 and rotatably mounted in the casing bore by means of a ball race thrust member 29, said mechanism being slidable through the ball race but normally held in operative position by means of a coil spring 30 which bears against the race at one end and against a shoulder 31 carried by the sleeve at its other end.

A groove 32 is formed in the actuating sleeve adjacent one end thereof and is provided with a conical head 33 for the purpose hereinafter set forth.

The gripping arms 34, 35 and 36 of the cable gripping mechanism are pivoted in the slots 37, 38 and 39 formed by the segments 17, 18 and 19, said arms being pivoted at the points 40 and having toothed gripping heads 41 adapted to securely grip the cable 27 when in operative positions.

The outer free ends 42 of the gripping arms contact the conical head 33 of the actuating sleeve 28. As shown in Figures 1 and 2 the gripping arms are shown in gripping positions and in Figure 3 these arms are shown released.

The means for actuating the mechanism 28 to release the gripping arms comprises; an actuating handle 43 having a stem 44 projecting through the plug 45 and having mounted on its lower end a crank disc 46 on which is secured a crank pin 47 and a roller 48, which roller extends into the groove 32 formed in the actuating sleeve 28.

Of course, the spring 30 normally forces the gripping fingers into gripping positions, but when it is desired to release said gripping fingers from the cable the handle 43 is rotated and the cranking action of the crank roller 48 causes the sleeve to be withdrawn against the urge of the spring and the gripping arms are released from the cable by the withdrawal of the conical head 33.

The cable is guided and held from buckling or backlashing at both ends of the device by means of flexible tubes 49 and 50 fixed to opposite ends of the case by means of set screws 52 and 51, respectively.

On the free end of the cable a cleaner 52 is shown, however, a grinding tool 53 or a wire brush 54 may be applied to the cable when desired for cleansing purposes.

In operation;

Assuming it is desired to clean or ream out an obstruction in a conduit or tube, the cleaner 52 is inserted against the obstruction and the motor is started, the cable, of course, being the while gripped tightly by the gripping mechanism. The whole interior mechanism is rotated within the casing while the casing is held securely against rotation by the operator. That is, the gripping fingers, driving gear 20, segments 17, 18 and 19, sleeve 28 and tube 26 rotate with the cable 27 while the remaining portions are held stationary.

The ball races 16 and 29 tend to act as antifriction thrust bearings while the device is in operation and when the cable 27 becomes shortened due to the cleaner 52 working through the obstruction the apparatus is released and moved back on the cable and the operation is continued.

The principal feature of the invention is to provide a device for progressively feeding a cleaning cable into a pipe while the device is merely moved a short distance to and fro along its longitudinal axis. The operator in moving the device can keep both hands on the device at all times. One of the hands is placed on the control handle and a mere twisting of the wrist of this hand will rotate the handle a distance sufficient to free the cone 33 from the fingers and thereby release the fingers from the cable. This permits the operator to move the casing along the cable into a new position, while the actuating sleeve 28 is still rotated. The operator in now causing the fingers to again grip the cable merely twists the wrist on the hand grasping the handle 43, and permits the handle to return to normal position, and this will cause the spring 30 to move the conical head 33 and cause the fingers to again grip the cable. The operator can now force the casing forwardly and thus feed an additional portion of the cable into the pipe which is being cleaned.

After the device is once started in operation it is not necessary for the operator at any time to remove either hand from the device as the cable is progressively fed into the pipe. This assures a rapid feeding of the cleaning cable into the pipe and sufficient power is afforded for rotating the cable because the rotation of the cable does not depend upon a manually actuated mechanism.

The cleaner 52 and other elements 53 and 54 are short so that the same may be forced around short turns as in L's or the like.

I claim and desire to secure by Letters Patent of the United States the following:—

1. A cleaning appliance comprising a casing, a rotatable chuck carried thereby, a spring for moving the chuck into engagement with a snake for rotating the latter, a chuck release handle movably carried by the casing, and means connecting the handle with the chuck for freeing the chuck from the snake when the handle is actuated, said means permitting the chuck to continue to rotate independently of the handle.

2. A cleaning device comprising a casing, a chuck rotatably carried by the casing, a spring for connecting the chuck to a snake for rotating the latter, said chuck having an annular groove therein, a handle extending radially from the casing and being rotatable about the handle axis, said handle having an eccentrically mounted pin slidable in the groove, whereby a rocking of the handle will free the chuck from the snake while still permitting the chuck to rotate.

FRANCIS A. AUER.